(12) United States Patent
Lechner (10) Patent No.: US 11,881,691 B2
(45) Date of Patent: Jan. 23, 2024

(54) SCREW CONNECTION SYSTEM

(71) Applicant: PFLITSCH GMBH & CO. KG, Hueckeswagen Nordrhein Westfalen (DE)

(72) Inventor: Martin Lechner, Lindlar (DE)

(73) Assignee: PFLITSCH GMBH & CO. KG, Hueckeswagen Nordrhein Westfalen (DE)

( * ) Notice: Subject to any disclaimer, the term of this patent is extended or adjusted under 35 U.S.C. 154(b) by 745 days.

(21) Appl. No.: 17/006,202

(22) Filed: Aug. 28, 2020

(65) Prior Publication Data
US 2020/0393064 A1 Dec. 17, 2020

Related U.S. Application Data

(63) Continuation of application No. PCT/EP2019/054880, filed on Feb. 27, 2019.

(30) Foreign Application Priority Data

Feb. 28, 2018 (DE) ...................... 10 2018 104 617.0

(51) Int. Cl.
*H02G 3/06* (2006.01)
*H02G 15/013* (2006.01)
(Continued)

(52) U.S. Cl.
CPC .......... *H02G 15/013* (2013.01); *H02G 3/088* (2013.01); *H02G 15/04* (2013.01); *F16L 5/06* (2013.01);
(Continued)

(58) Field of Classification Search
CPC ... F16L 5/06; F16L 41/10; F16L 41/08; F16L 41/088; F16L 41/14; F16L 41/12;
(Continued)

(56) References Cited

U.S. PATENT DOCUMENTS 3,668,612 A * 6/1972 Nepovim ................. H01R 9/05
285/248
3,799,584 A * 3/1974 Slocum ................. F16L 19/065
411/432
(Continued)

FOREIGN PATENT DOCUMENTS

DE 102007007780 8/2008
DE 202007003957 U1 9/2008
(Continued)

OTHER PUBLICATIONS

International Search Report for International Application PCT/EP2019/054880, dated May 16, 2019.

*Primary Examiner* — Aaron M Dunwoody
(74) *Attorney, Agent, or Firm* — Burris Law, PLLC (57) ABSTRACT

A screw-connection system for connecting a long-shaped part with a terminal geometry includes at least a pressure element, a terminal part, and a seal. The pressure element has at least one contact-wall section with a contact surface. The seal has at least one outer radial-seal surface and at least one axial-seal surface. The outer radial-seal surface of the seal interacts in a sealing manner at least partially with the contact surface of the contact-wall section and the axial-seal surface is configured at least for partial sealing with the terminal geometry.

20 Claims, 6 Drawing Sheets

(51) Int. Cl.
*H02G 15/04* (2006.01)
*H02G 3/08* (2006.01)
*F16L 5/06* (2006.01)
*F16L 41/10* (2006.01)
*H02G 3/22* (2006.01)

(52) U.S. Cl.
CPC ............ *F16L 41/10* (2013.01); *F16L 2201/40* (2013.01); *H02G 3/22* (2013.01)

(58) Field of Classification Search
CPC ..... F16L 19/065; F16L 19/062; F16L 19/061; F16L 19/06; F16L 19/00; H02G 3/06; H02G 3/22; H02G 15/013
USPC ................................ 285/149.1, 151.1, 154.1
See application file for complete search history.

(56) References Cited

U.S. PATENT DOCUMENTS

| | | | | |
|---|---|---|---|---|
| 4,224,464 | A | * | 9/1980 | Bunnell .................. F16L 41/14 285/151.1 |
| 4,674,818 | A | * | 6/1987 | McMills .................. H01R 9/05 439/275 |
| 5,087,795 | A | * | 2/1992 | Guginsky ............ H02G 3/0675 174/541 |
| 5,866,853 | A | * | 2/1999 | Sheehan .............. H02G 3/0675 174/653 |
| 2008/0217918 | A1 | * | 9/2008 | Preston .................. F16L 19/10 285/354 |
| 2014/0145436 | A1 | * | 5/2014 | Charcenko ................ F16L 5/06 285/355 |
| 2015/0084335 | A1 | * | 3/2015 | Farrell .................. F16L 19/065 285/343 |
| 2019/0145557 | A1 | * | 5/2019 | Mueller ................ F16L 19/061 277/622 |
| 2019/0170253 | A1 | * | 6/2019 | Binder ...................... H02G 3/06 |
| 2019/0277431 | A1 | * | 9/2019 | Shemtov .............. H02G 3/0481 |
| 2020/0049289 | A1 | * | 2/2020 | Levy .................... F16L 15/007 |
| 2020/0393064 | A1 | * | 12/2020 | Lechner ............... H02G 15/013 |

FOREIGN PATENT DOCUMENTS

| | | |
|---|---|---|
| DE | 202008017534 | 12/2009 |
| DE | 102013109424 | 3/2015 |
| EP | 1898506 | 3/2008 |
| EP | 2735779 | 5/2014 |
| GB | 1059749 A | 2/1967 |
| WO | 2004049532 | 6/2004 |
| WO | 2017029232 | 2/2017 |

* cited by examiner

SCREW CONNECTION SYSTEM

CROSS-REFERENCE TO RELATED APPLICATIONS

This application is a continuation of International Application No. PCT/EP2019/054880, filed on Feb. 27, 2019, which claims priority to and the benefit of DE 10 2018 104 617.0, filed on Feb. 28, 2018. The disclosures of the above applications are incorporated herein by reference.

FIELD

The present disclosure relates to a screw-connection system for screwing at least one long-shaped part having a terminal geometry.

BACKGROUND

The statements in this section merely provide background information related to the present disclosure and may not constitute prior art.

Screw-connection systems for the screwing of long-shaped parts having a terminal geometry are known from the prior art. Thus, for example, DE 20 2008 017 534 U1 describes a device for sealing and clamping guiding of long-shaped parts having a nipple, on the end of which a perforated pressure screw is screwable. A seal insert is clamped in between the pressure screw and the nipple. The long-shaped part is guided by the nipple, a seal insert, and a pressure screw. The described device further includes a sleeve made of an elastic material, and the sleeve is supported in a sealing manner in the intended position against the pressure screw, surrounds the threaded region of the nipple, and the threaded region is located between the pressure screw and an installation plane. Also, the sleeve rests against the installation plane.

In the screw-connection systems known from the prior art it is disadvantageous that they are either complex and thus expensive to install, or are expensive to adapt to a diameter of a long-shaped part.

SUMMARY

This section provides a general summary of the disclosure and is not a comprehensive disclosure of its full scope or all of its features.

An improved screw-connection system for long-shaped parts is provided. Also, a simplification of the installation of a long-shaped-part screw-connection that satisfies cleanliness requirements is provided.

A screw-connection system for connecting at least one long-shaped part with a terminal geometry includes a pressure element and a terminal part including a seal, wherein the pressure element comprises at least one contact-wall section including a contact surface, wherein the seal comprises an outer radial-seal surface and at least one axial-seal surface, wherein the outer radial-seal surface interacts in a sealing manner at least partially with the contact surface of the contact-wall section, and wherein the axial-seal surface is equipped for at least partial sealing with the terminal geometry.

Furthermore, the present disclosure provides a terminal part for use in a screw-connection system, wherein the terminal part comprises a terminal fastener, a seal, and a pressure-element terminal, wherein the seal is disposed between the terminal fastener and the pressure-element terminal.

Furthermore, the present disclosure provides a method for installing a screw-connection system having a terminal geometry and at least one long-shaped part, wherein a pressure-element terminal of a terminal part is connected to a pressure element, wherein before or after a partial assembling of the screw-connection system a terminal fastener of the terminal part is introduced into an opening of the terminal geometry, wherein before or after the partial assembling of the screw-connection system the at least one long-shaped part is guided at least through a receiving opening of the terminal part and an output opening of the pressure element, wherein the pressure element is applied to the terminal part such that a seal of the terminal part interacts in a sealing manner, at least in a partial-surface manner, with a contact surface of the pressure element, and the terminal part is introduced into the opening of the terminal geometry such that an axial-seal surface of the seal interacts with the terminal geometry in a sealing manner.

Furthermore, the present disclosure provides a use of a screw-connection system for sealing connection of a long-shaped part with a terminal geometry.

A screw-connection system for connecting a long-shaped part having a terminal geometry is proposed, which comprises at least a pressure element, a terminal part, and a seal. The pressure element comprises at least one contact-wall section including a contact surface. The seal comprises at least one outer radial-seal surface and at least one axial-seal surface. The outer radial-seal surface of the seal interacts in a sealing manner at least partially with the contact surface of the contact-wall section. The axial-seal surface is configured at least for partial sealing with the terminal geometry.

The screw-connection system is usable in particular for devices and machines in hygienically sensitive regions, for example in food production. These devices and machines should be easy to service and penetration by microorganisms is to be inhibited. The devices and machines should therefore be easy to clean in order to protect the products that come into contact with these machines and devices from contamination. Antiseptic components should be sterilizable or capable of being pasteurized. Furthermore, the cleaning of the machines or devices is to be designed safe and efficient. For example, in order to meet the hygienic requirements and to achieve a certain shelf life of the products, it is desired to keep the number of microorganisms in foodstuffs as low as possible. Screw-connections of long-shaped parts that are guided by terminal geometries are desired. Due to the simplicity and the lack of or at least greatly reduced nesting opportunities for microorganisms in gaps or openings, the screw-connection system according to the teachings of the present disclosure is advantageous. Due to the seal, which makes possible both an axial seal and a radial seal, gaps are avoided. A secure screwing of at least one long-shaped part is provided by the screw-connection system. During installation, it is not necessary to adapt the diameter of the screw-connection system to the diameter of at least one long molded part by adding or exchanging components, as is known from the prior art. In particular, no additional parts are used, such as, for example, washers, which are placed between a terminal part and a terminal geometry for the adaptation of a pressing or sealing against long-shaped parts having different diameters.

The terminal part is configured for example as a nipple and in some variations as a double nipple. In one variation of the present disclosure, the terminal part includes a terminal fastener and a pressure-element receptacle. Connectors and/or pressure-element receptacles are configured as threads, for example external threads. A connection to the terminal geometry is producible using the terminal fastener. In one variation, the pressure-element receptacle includes key-system surfaces, for example, two, four, six, or eight, which in one variation at least partially interrupt a number of threads. In some variations the terminal part includes a seal section. The seal section is disposed between the terminal fastener and the pressure-element receptacle. In one variation it is provided that the seal is formed by a seal section. In at least one variation the seal is disposed at least partially on the seal section.

In one form of the present disclosure it is provided that the terminal part including the seal, i.e., the terminal part and the seal, and thus also the seal section, are configured in a uniform-material or non-uniform-material manner. In a another form it is provided that the terminal part and the seal are configured one-piece. As used herein, the term "one-piece" refers to at least two parts, for example the seal and the terminal part, materially connected to each other. If parts connected one-piece are manufactured from one material, the parts are uniform-material. Furthermore, "one-piece" can also be understood to mean that at least two parts can include different materials, which, however, are in a position to connect on at least one boundary surface due to the material, i.e., are materially connected. For example, the seal can include a different plastic material than the terminal part. One-piece connections cannot be released from each other without destruction. One-piece and in particular uniform-material parts can be, for example, injection molded or manufactured using a generative manufacturing method, for example, by one-component injection-molding methods or two-component injection-molding methods. As used herein, the term "non-uniform-material" refers to two parts, for example the seal and the terminal part, not materially connected and thus are two-piece. The parts can include different or identical materials.

In one variation, wherein the terminal part and the seal are configured one-piece or uniform-material, with respect to the seal section the seal has the outer radial-seal surface and at least one axial-seal surface.

In one form, wherein the terminal part and seal are configured non-uniform-material, the seal is configured as a seal sleeve. In particular, due to the non-uniform-material design, mutually adjacent surfaces of the seal and the terminal part result. In particular, the seal section includes a seal-section surface. Further the seal includes an inner radial-seal surface. The inner radial-seal surface and the seal-section surface are at least partially adjacent to each other. Further a clear width of the seal, which is configured in particular as a seal sleeve, is smaller in the uninstalled state than an outer diameter of the corresponding seal-section surface in the installed state. The seal thereby sits on the seal section with a press-fit.

In one variation the pressure element is configured as a union nut. In particular, the pressure element includes an outlet opening that is further disposed on the head-side end of the pressure element. Particularly it is provided that the outlet opening is configured for the guiding of at least one long-shaped part. The outlet opening is in particular a circular opening.

Further the pressure element includes an attachment structure that is configured as an internal thread. The attachment structure can be associated with the outlet opening. In at least one variation it is provided that the pressure element includes a head-seal receptacle, which in one variation comprises a smooth inner surface. The head-seal receptacle is a space section in the pressure element that is round in cross-section.

Furthermore, the pressure element comprises the contact-wall section including the internal contact surface. In one variation the contact surface is a partial surface of an inner surface of the contact-wall section. Further it is provided that the contact surface is associated with the foot-side end of the pressure element or of the contact-wall section. In some variations the contact surface is disposed on a radially-inwardly-projecting, for example completely encircling shoulder on the inner side of the contact-wall section. The contact surface has a defined surface size that is predetermined, for example, by a height of the shoulder. It is advantageous in particular that a defined sealing of the contact surface is generated and further a friction resistance, which is generated between the seal and the contact surface, remains the same when the pressure element is screwed onto the terminal part. The clear width of the pressure element in the region of the contact surface is smaller than an outer diameter of the seal. A pressing between the seal and the contact surface can thus advantageously be generated.

If directions are used in the context of the present disclosure, then they are to be understood as based on the conventional use of the screw-connection system. As used herein, the term "foot-side" refers to the use of the screw-connection system and a corresponding feature associated with a terminal geometry or directed thereto. As used herein, the term "head-side" refers to the use of the screw-connection system and a corresponding feature remote from or also facing away from the terminal geometry.

It is advantageously provided that the contact-wall section forms an opening space foot-side. Furthermore, the pressure element comprises an outer circumference or an outer surface, which in at least one variation includes key-system surfaces, in particular for a wrench, for example, two, four, five, six, or eight surfaces.

In one variation the screw-connection system includes a head seal. The head seal is located on the head-side of the terminal part. In one form, the terminal part and the head seal are configured as one-piece or uniform-material or non-uniform material. The head seal includes a pressure section. The pressure section is configured at least partially lens-shaped or at least partially dome-shaped or hat-shaped. In some variations where the head seal is not materially uniform with the terminal part, the head seal includes a conical or cylindrical section. The head seal comprises a through-opening that in particular engages through the conical or cylindrical section and the pressure section. Further the through-opening tapers in the region of the pressure section. Furthermore the tapering of the through-opening extends toward a head side of the head seal. In at least one variation wherein the terminal part and the head seal are configured one-piece or uniform-material, it is provided that the head seal includes only a pressure section.

In one form the seal section of the terminal part has a smooth outer circumference. In some variations it is provided that the outer circumference includes a chamfer at least at the head-side end of the seal section. In at least one variation wherein the terminal part and seal are configured non-uniform-material, it is provided that the seal section includes at least one retainer. The retainer can be configured as a rib, for example approximately one to approximately eight ribs, approximately one to approximately four ribs, or approximately two to approximately four ribs, can be provided.

If the term "approximately" is used in the present disclosure in the context of values or value ranges, then a tolerance range is to be understood that the person skilled in this field considers common, in particular a tolerance range of ±20%, for example a tolerance range ±10%, or a tolerance range of ±5%.

It is provided that the retainer includes at least one retainer axial surface. The retainer axial surface is a surface or a surface section of the retainer, the surface normal of which surface region essentially points toward the foot of the terminal part. In at least one variation it is provided that the surface normal of the retainer axial surface has an angle to the longitudinal direction of the terminal part of approximately 0° to approximately 30°, for example approximately 0° to approximately 5°.

In the present disclosure the term "essentially" indicates a tolerance range that is to be substituted by the person skilled in the art from economic and technical perspectives such that the corresponding feature is still to be recognized or is realized as such.

In the present disclosure the term "surface normal" indicates a vector that is perpendicular to a surface. For example, the surface normal is the vector that stands on an essentially flat surface.

In some variations it is provided that the outer circumference of the seal section includes the seal-section surface. In at least one variation it is provided that the seal-section surface extends essentially completely in the longitudinal and/or circumferential direction over the seal section.

The terminal part further comprises a terminal-part opening. In some variations the terminal-part opening is a through-opening in the longitudinal direction, and the through-opening is configured for receiving at least one long-shaped part. The terminal-part opening comprises a through-width. Further the terminal-part opening comprises an essentially smooth inner surface. In at least one variation it is provided that the terminal-part opening is configured funnel-shaped on the head side. Furthermore in a variation wherein the terminal part and head seal are configured non-uniform-material, it is provided that the terminal part comprises a head-seal bearing on the head side and the head-seal bearing is gripped-through by the terminal part opening.

In one variation a foot-side opening of the terminal-part opening is enclosed by a terminal-geometry contact surface. The terminal-geometry contact surface is a flat annular surface whose surface normal is oriented essentially parallel to the longitudinal direction of the terminal part.

The seal comprises an outer radial-seal surface and an axial-seal surface. In one form the outer radial-seal surface comprises an essentially smooth surface. In some variations it is provided that the outer radial-seal surface comprises a chamfer that is disposed in particular on the head-side end of the radial-seal surface.

For example, the axial-seal surface seals toward the axial direction. The axial-seal surface is a surface section whose surface normal is disposed essentially parallel to a longitudinal axis of the seal or of the terminal part, and further toward the foot of the terminal part. In at least one variation, the radial-seal surface seals toward the radial direction. The inner and/or outer radial-seal surface is a completely encircling surface section whose surface normals are disposed essentially parallel to a radius of the seal or of the terminal part, and are further disposed perpendicular to the longitudinal axis of the seal.

In one form wherein the terminal part is configured one-piece or uniform-material with the seal, the axial-seal surface is disposed with the terminal-geometry contact surface on planes offset in the longitudinal direction. In one form wherein the terminal part and seal are configured non-uniform-material, the seal is configured as a seal sleeve comprising at least one radially-inwardly-extending projection. In at least one form it is provided that at least one projection comprises the axial seal surface. In some variations it is provided that the surface normal of the axial-seal surface has an angle of approximately 0° to approximately 20°, for example approximately 0° to approximately 10° with respect to the longitudinal axis. In at least one variation the surface normal of the axial-seal surface has an angle of approximately 0° to approximately 5° with respect to the longitudinal axis.

In at least one variation it is provided that the seal is configured as a seal sleeve including the inner radial-seal surface. In some variations it is provided that at least one projection is disposed on the inner radial seal surface. In one variation it is provided that the inner radial-seal surface includes a plurality of projections, for example approximately two to approximately eight, or approximately two to approximately four projections. In some variations it is provided that at least one projection is configured as a rib. For example, at least one rib is configured completely encircling. In at least one variation, it is provided that at least one projection that also forms an axial seal surface is disposed on the seal on the foot side. For example, a projection configured as a rib is disposed completely encircling on the foot-side end of the seal.

The terminal geometry is a component through which at least one long-shaped part is guidable. In some variations, the terminal geometry is not part of the inventive screw-connection system. For example, the terminal geometry is a wall, a housing, or a cable guide. The screw-connection system is advantageously attached to the terminal geometry not attributable to the screw-connection system. The terminal geometry includes a through-opening through which at least one long-shaped part is guidable. Further, the screw-connection system is attached to the terminal geometry such that the longitudinal axis of the terminal part is essentially perpendicular to a surface of the terminal geometry and/or engages-through the through-opening. In one variation the through-opening includes a thread, wherein the terminal part is screwable with its terminal fastener comprising an external thread. In some variations the through-opening includes no thread and is configured in particular as a bore.

At least one long-shaped part comprises at least one elongated, for example, flexible body selected from a group selected from a group comprising cables, hoses, and/or tubes. The screw-connection system can be used for the screw-connecting of cables.

In one variation it is provided that the seal is configured as a seal sleeve comprising at least one radially-inwardly extending projection that engages in at least partially an form-fit manner into an undercut of the terminal part. An at least partial engagement that is in contact between the terminal part and the seal sleeve does not exist completely in the undercut. For example, the undercut can be provided at a setback that is disposed on the foot-side end of the seal section of the terminal part. Due to this design a shifting on the terminal part of the seal formed as a seal sleeve is inhibited or essentially prevented.

In one form it is provided that the seal is configured as a seal sleeve comprising a plurality of projections that engage in spaces formed between the retainer of the terminal fastener. For example, approximately two to approximately eight, or approximately two to approximately four, projections can be provided. In some variations, the spaces can be open one-side. In at least one form it is provided that a space disposed on the seal section open toward the foot side is designed for forming an axial-seal surface through a projection of the seal sleeve, and the projection engages therein. For example, in one form wherein the projections are configured as ribs, these ribs can engage between the retainer also configured as ribs and the spaces thus provided of the seal section of the terminal part. Due to this form a shifting on the terminal part of the seal formed as a seal sleeve is inhibited or essentially prevented.

In some variations it is provided that at least one projection includes an axial seat surface. A surface normal of the axial-seat surface points essentially toward the head side of the seal. In at least one variation it is provided that the surface normal of the axial-seal surface has an angle of approximately 0° to approximately 20°, for example approximately 0° to approximately 10° with respect to the longitudinal axis of the seal. In some variations the surface normal of the axial-seal surface has an angle approximately 0° to approximately 5°, with respect to the longitudinal axis of the seal. It is provided that at least one projection of the seal is configured as a seal sleeve and comprises the axial-seat surface that interacts with the retainer axial surface of the retainer of the terminal part. If oppositely directed forces act on the terminal part and the seal, the seal is not moved in the longitudinal direction of the seal. The retainer axial surface and the axial-seat surface press against each other such that a displacing is inhibited or essentially prevented. For example, at least one axial-seat surface of at least one projection is disposed essentially parallel to the retainer axial surface of at least one retainer of the seal section.

The attachment structure of the pressure element is associable with the pressure-element receptacle of the terminal part. For example, using the attachment structure of the pressure element, and the attachment structure being configured as an internal thread, the pressure element is screwable onto the pressure-element receptacle, which is configured as an external thread. In at least one variation it is provided that the attachment structure of the pressure element is connectable to the pressure-element terminal of the terminal part such that the contact-wall section at least partially overlaps the seal section. The pressure element is screwable onto the terminal part such that a contact surface comes at least partially into contact with the seal disposed on the seal section. In some variations it is provided that the seal, which is configured as a seal sleeve, is disposed in a sealing manner between the seal section of the terminal part and the contact-wall section of the pressure element. The contact surface of the pressure element comes at least partially into contact with the outer radial-seal surface. The head seal can be compressed by the screw-connection of the pressure element on the terminal part. In particular, in variations wherein the terminal part and head seal are configured as a non-uniform-material, the head seal nests with the conical or cylindrical section at least partially into the head-seal bearing of the terminal part. The through-opening is at least partially constricted by the pressure of the pressure element. If at least one long-shaped part is located in the through-opening of the head seal, an inner surface of the through-opening is in particular nesting in a sealing manner against the long-shaped part. Further, in some variations the conical or cylindrical section of the head seal is associable with the head-seal bearing of the terminal part. In particular, the inner surface of the head-seal receptacle of the pressure element presses onto the pressure section of the head seal when the pressure element is screw-connected to the terminal part.

In at least one variation it is provided that the seal protrudes a defined length over the terminal-geometry contact surface in the longitudinal direction of the terminal part. If the terminal part is screwed-in into the terminal geometry, the seal is generally compressed at least on the foot side until the terminal-geometry contact surface of the terminal part completely abuts against the terminal geometry. A defined pressing of the seal is thereby generated. Further, in some variations it is achieved that independent of the screwing-on of the pressure element, which causes a pressing-on of the head seal, a defined sealing of the terminal part occurs with respect to the terminal geometry. In one form it is provided that the seal is compressible in a sealing manner axially in a defined manner with the terminal geometry and radially in a defined manner with the pressure element. Since the terminal-geometry contact surface of the terminal part is disposed radially inwardly from the seal, which is configured as a seal sleeve, a hygienically safe sealing is generated in particular according to the guidelines of the European Hygienic Engineering and Design Group (EHEDG) for hygienic areas, for foodstuff-producing industries. The screw-connection system is dust- and water-tight according to protection class IP68 or IP 69K. And the screw-connection system offers protection with high-pressure cleaning.

In some variations, the screw-connection system has only one seal having a double function disposed on the terminal part and a seal is generatable both axially and radially, for example a seal between a terminal part and a terminal geometry, and a terminal part and a pressure element. Accordingly, costs are thereby saved. Furthermore the handling of the screw-connection system is simpler. The seal surfaces and the seal forces or surface-pressings on the seal are advantageously known and defined such that a detectable and in particular recordable sealing can occur. An advantage of the screw-connection system is its simple construction. For example, the pressure element can be screwed-on with different strength or in a fixed manner onto the terminal part, and thus the head seal is compressed with the long-shaped part depending on its diameter in order to seal it. In some variations, the screw-connection system does not require washers. The pressure element can be simply screwed onto the terminal part until the head seal has nested in a sealing manner against the circumference of the long-shaped part. A matching of the clear width of the head-seal opening to a diameter of the long-shaped part is thus easy to be performed. Furthermore the installation the screw-connection system is comparable to a standard screw-connection system. The possibility of cost-effective mass production of such a screw-connection system is considered an advantage of the inventive screw-connection system.

The present disclosure is not limited to the principles shown and described of the seal. Rather, further principles, in particular known from the prior art, of the long-shaped part seal can also be combined with the described designs of the screw-connection system.

In one form the seal, the head seal, and/or the terminal part comprises at least one seal material selected from a group comprising plastic, thermoplastic elastomers, rubber, and/or silicone. In one form the pressure element and/or the terminal part include at least one housing material selected from a group comprising a metal, food-grade metals, stainless steel, and/or a plastic including or not including a coating. It is provided that components made of plastic include a detectable material. In particular, detectable materials can be found by X-ray or metal detectors.

In one variation it is provided that the seal, which is configured as a seal sleeve, is mounted on the terminal part. In some variations it is provided that the seal is over-molded onto the terminal part. In at least one variation it is provided that the terminal part is connected one-piece to the seal. In particular the seal is manufactured together with the terminal part using two-component injection-molding methods. In a further variation, the terminal part and the seal include a seal material, for example a very hard seal material such as a block copolyester having a hardness greater than approximately 90 Shore A. In some variations the seal material has a hardness of approximately 91 Shore A to approximately 100 Shore A. In the present disclosure, Shore A is according to DIN ISO 7619-1, in the edition valid in February 2018, tested with a hold time of 3 s for vulcanizates and 15 s for elastomers. In an alternative form it is provided that the terminal part and the seal are connected in a one-piece manner. For example, the terminal part and the seal are manufactured in a tool.

In some variations wherein the terminal part and the seal are configured as non-uniform-material, it is provided that the seal section comprises the seal-section surface, wherein the seal, which is configured as a seal sleeve, comprises the inner radial-seal surface, wherein the seal-section surface interacts with the inner radial-seal surface in a sealing manner. In one form it is provided that the terminal part and the seal, which is configured as a seal sleeve, are configured as non-uniform-material. Mutually adjacent seal surfaces thereby result, for example the seal-section surface of the terminal part and the inner radial-seal surface of the seal. In one form the seal, which is configured as a seal sleeve, is configured such that in the uninstalled state it has a smaller clear width than the terminal part outer diameter at the corresponding location in the installed state. It is thereby achieved that the seal expands during the installing and sits on the terminal part with a press-fit.

In one form it is provided that the terminal part includes at least one undercut that is associated with the foot end of the terminal part. In accordance with the inner radial-seal surface the seal, which is configured as a seal sleeve, includes at least one corresponding, inwardly-extending projection that engages in at least a partially form-fit manner into at least one undercut.

In another form it is provided that the seal section of the terminal part includes one or more retainers that are configured as ribs. In accordance with the inner radial-seal surface the seal, which is configured as a seal sleeve, includes at least one corresponding projection that engages behind a foot-side rib that forms a one-sided foot-side open space, and/or engages between the ribs in spaces formed there.

In some variations the housing material of the terminal part can be made of plastic or metal. Furthermore, in at least one variation the seal material of the seal can be made of plastic, rubber, or silicone. In some forms, the seal can be manufactured separately or over-molded on the terminal part.

In still another form of the present disclosure, it is provided that the terminal part is configured one-piece or uniform-material with the seal. For example, the terminal part and the seal are manufactured in one operation, for example, injection molded, sintered, or generatively manufactured. In such a form the terminal part can be manufactured from plastic and/or a very hard seal material. The seal can be manufactured from silicone or a plastic, for example the same seal material as the terminal part. In still yet another form, the terminal part can be configured one-piece or uniform-material with the seal and the head seal of the pressure element.

In such forms, the head seal can be associated one-piece or uniform-material or non-uniform-material with the terminal part.

Furthermore, a terminal part can be use in an above-described screw-connection system, wherein the terminal part comprises a terminal fastener, a seal, and a pressure-element terminal, wherein the seal is disposed between terminal fastener and pressure-element terminal. The terminal fastener is configured as a double nipple. In at least one variation it is provided that the seal section includes at least one retainer that is further embodied as a completely encircling rib. Furthermore the terminal part can be configured as described above.

Furthermore a method for installing a screw-connection system including a terminal geometry and at least one long-shaped part is provided. A pressure-element terminal of a terminal part is connected to a pressure element. Before or after at least a partial installing of the screw-connection system, a terminal fastener of the terminal part is introduced into an opening of the terminal geometry, wherein before or after at least the partial installing of the screw-connection system at least one long-shaped part is guided at least through a terminal-part opening of the terminal part and an outlet opening of the pressure element. The pressure element is applied to the terminal part such that a seal of the terminal part acts, at least in a partial-surface manner, in a sealing manner with a contact surface of the pressure element. The terminal part is introduced into the opening of the terminal geometry such that an axial seal surface of the seal interacts in a sealing manner with the terminal geometry.

The seal is connected to the terminal part. In the present disclosure, a "connecting of the seal to the terminal part, for example the seal section," is understood to mean that the terminal part is introduced into the seal, which is configured as a seal sleeve, or the seal is over-molded onto the terminal part, or the seal is produced with the terminal part in a manufacturing step and is material-connected.

Furthermore a use of an above-mentioned screw-connection system is provided for a sealing screw-connection of a long-shaped part with a terminal geometry.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
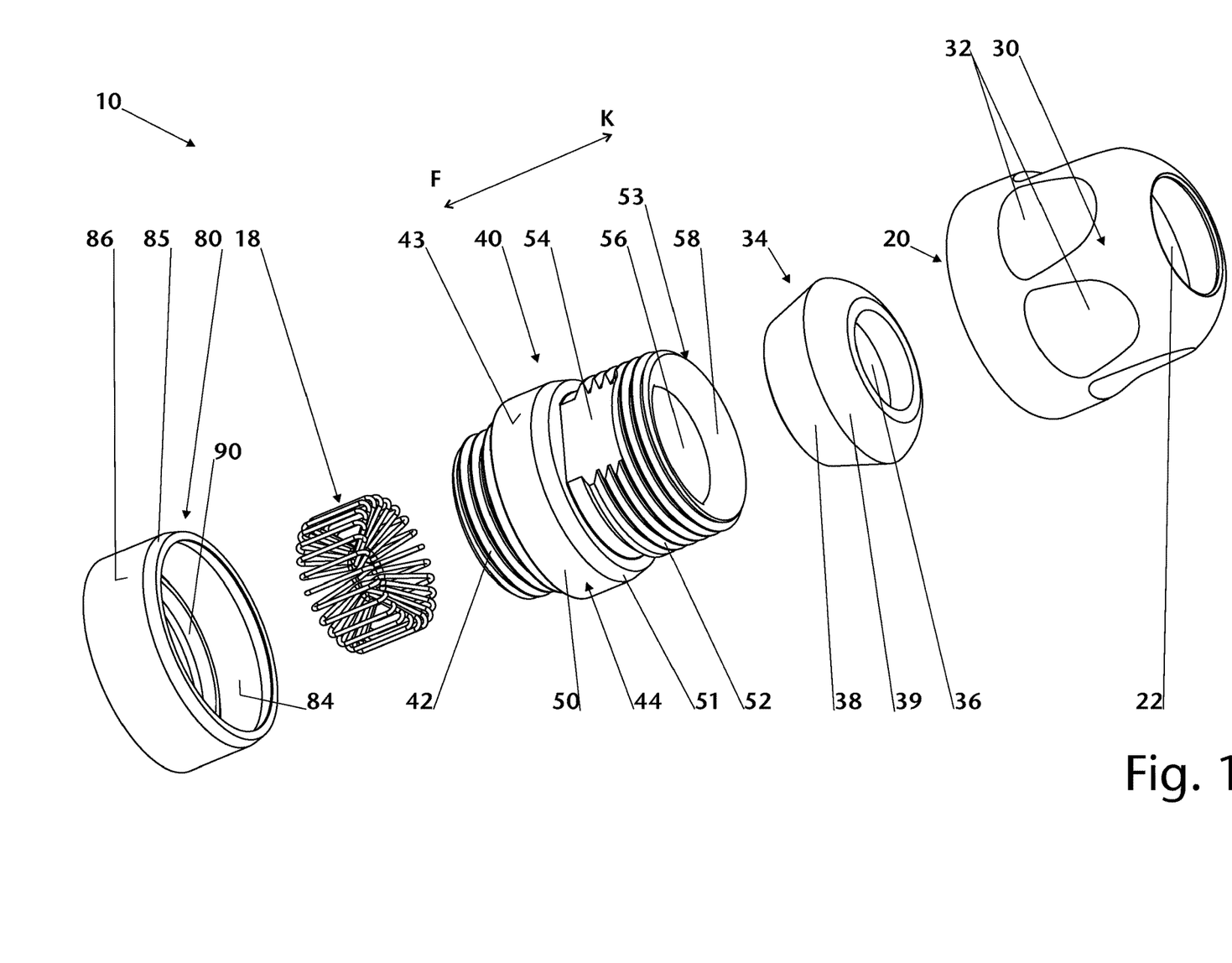
FIG. 1 shows an exploded view of a first form of a screw-connection system according to the teachings of the present disclosure.

FIG. 1 shows an exploded view of a screw-connection system 10. A seal 80 configured as a seal sleeve comprises an inner radial-seal surface 84 and an outer radial-seal surface 86. Furthermore it can be seen in FIG. 1 that the seal 80 includes a projection 90 that projects radially inward. The outer radial-seal surface 86 includes a chamfer 85.

A terminal part 40 is configured as a double nipple. The terminal part 40 comprises a terminal fastener 42 and a pressure-element terminal 52, wherein a seal section 44 is disposed between the terminal fastener 42 and the pressure-element terminal 52. Both the terminal fastener 42 and the pressure-element terminal 52 are configured as an external thread. Furthermore the pressure-element terminal 52 includes key-system surfaces 54, using which the terminal part 40 can be screwed-in via the terminal fastener 42 into a terminal geometry 14 not shown here that can be seen, for example, in FIG. 3. The terminal part 40 further includes a terminal-part opening 56 that is passing completely through the terminal part 40. On a head-side end 53 of the terminal part 40, the terminal part 40 includes a head-seal bearing 58, into which a head seal 34 having a conical section 38 is placeable. The head-seal bearing 58 has a funnel-shaped or curved design, for example having a radius. The seal section 44 comprises a smooth seal-section surface 43 that corresponds to the inner radial seal surface 84, also smoothly embodied in this design, of the seal 80. Furthermore the seal section 44 comprises a chamfer 51. In order to improve the electromagnetic compatibility, an electromagnetic compatible (EMC) spring 18 can optionally be introduced into the terminal part.

The head seal 34 includes a head-seal through-opening 36. Furthermore, in addition to the conical section 38 that is associable with the head-seal bearing 58, the head seal 34 includes a pressure section 39 that is configured lens-shaped.

A pressure element 20 configured as a union nut includes an outlet opening 22. The pressure element 20 has an outer circumference 30 on which key-system surfaces 32 are formed.

Figure 2:
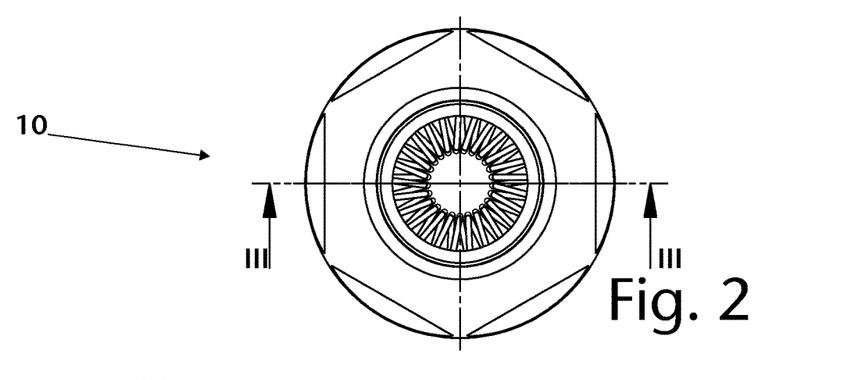
FIG. 2 shows an end view of the screw-connection system from FIG. 1.

FIG. 2 shows an end view of the installed screw-connection system 10 from FIG. 1.

Figure 3:
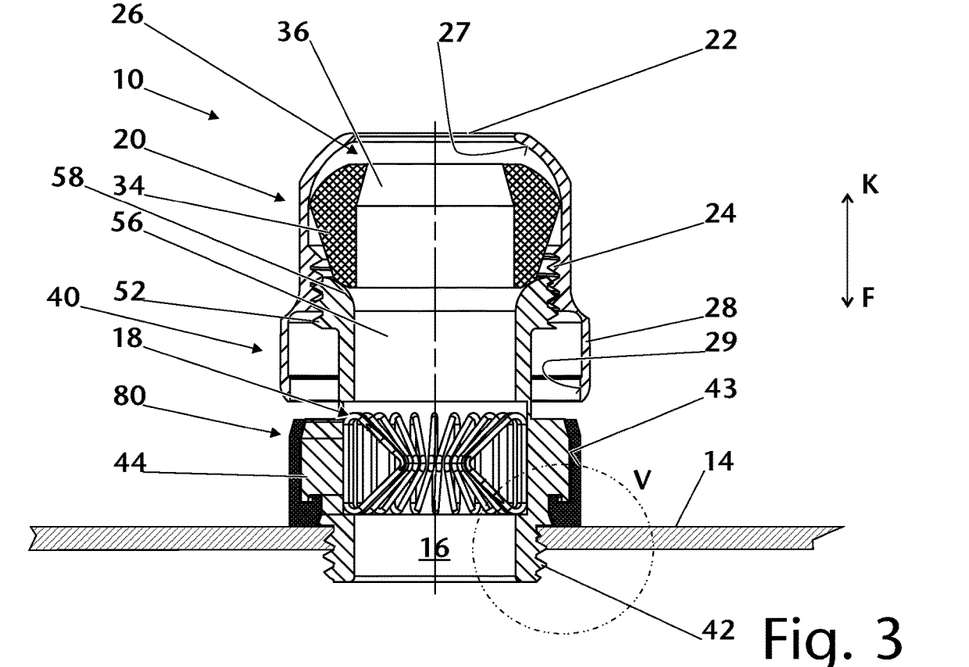
FIG. 3 shows a sectional view III-III from FIG. 2.

FIG. 3 shows a sectional view III-III from FIG. 2. It can be seen that the terminal part 40 including the terminal fastener 42 is screwed into a through-opening 16 of the terminal geometry 14. The seal 80 is disposed on a seal-section surface 43 of the seal section 44. The EMC spring 18 is disposed in the foot-side region F of the terminal-part opening 56. Furthermore it can be seen in FIG. 3 that the pressure element 20 is screwed-on onto the pressure-element terminal 52 using an attachment structure 24. The attachment structure 24 is configured in particular as an internal thread. In addition to the outlet opening 22, the pressure element 20 includes a head-seal receptacle 26 that is disposed head-side K of the attachment structure 24. The head-seal receptacle 26 is a spatial section inside the pressure element 20, which spatial section is at least partially located by the head-seal 34, and particularly the lens-shaped pressure section 39 with the head-seal through-opening 36 tapering toward a head side of the head seal 34. FIG. 3 shows only a partial installing of the pressure element 20 on the terminal part 40. If the pressure element 20 is further screwed onto the terminal part 40 in the foot-side F direction, an inner surface 27 presses against the head seal 34 and presses it onto the head-seal bearing 58 of the terminal part 40. A clear width of the head-seal through-opening 36 thereby changes at least partially, which for the sake of clarity is not further indicated here.

Furthermore, by the screwing-on of the pressure element 20 onto the terminal part 40, a contact surface 29 of a contact-wall section 28 of the pressure element 20 is brought into contact with the outer radial-seal surface 86 of the seal 80. A defined radial sealing thereby results between the terminal part and the pressure element 20. The contact surface 29 is disposed on a not-further-indicated radially-inwardly-projecting, completely encircling shoulder on the inner side of the contact-wall section 28. Due to this design the contact surface 29 has a defined surface size that is predetermined by a height of the shoulder. It is advantageous in particular that a defined sealing of the contact surface 29 is generated, and further a frictional resistance that is generated between seal and contact surface remains the same with screwing-on of the pressure element 20 onto the terminal part 40—independent of how far the pressure element 20 is screwed onto the terminal part 40.

Figure 4:
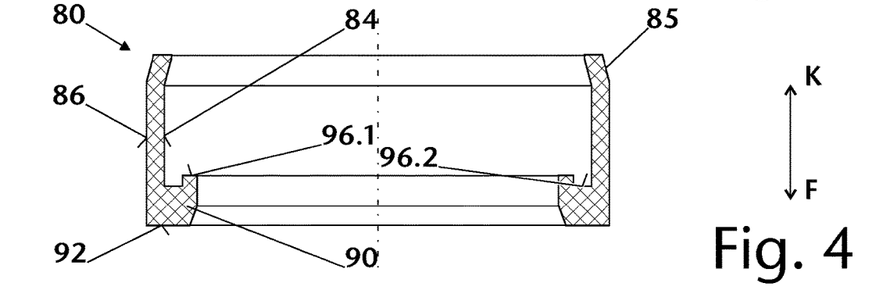
FIG. 4 shows an isolated seal from FIG. 3.

FIG. 4 shows the seal 80 from FIG. 3 in isolation. In FIG. 4 it can be seen that the seal 80 includes an outer radial-seal surface 86 and an inner radial-seal surface 84 that in this form are concentrically opposing. Furthermore the seal 80 includes a chamfer 85 that promotes contacting with the contact surface 29 of the contact-wall section 28 of the pressure element 20. A peeling of the seal 80 from the terminal part 40 during screwing-on of the pressure element 20 over the seal 80 is inhibited or prevented by the chamfer 85. Furthermore a projection 90 can be seen including head-side K formed axial-seat surfaces 96.1 and 96.2, and foot-side F formed axial-seal surfaces 92.

Figures 5, 6:
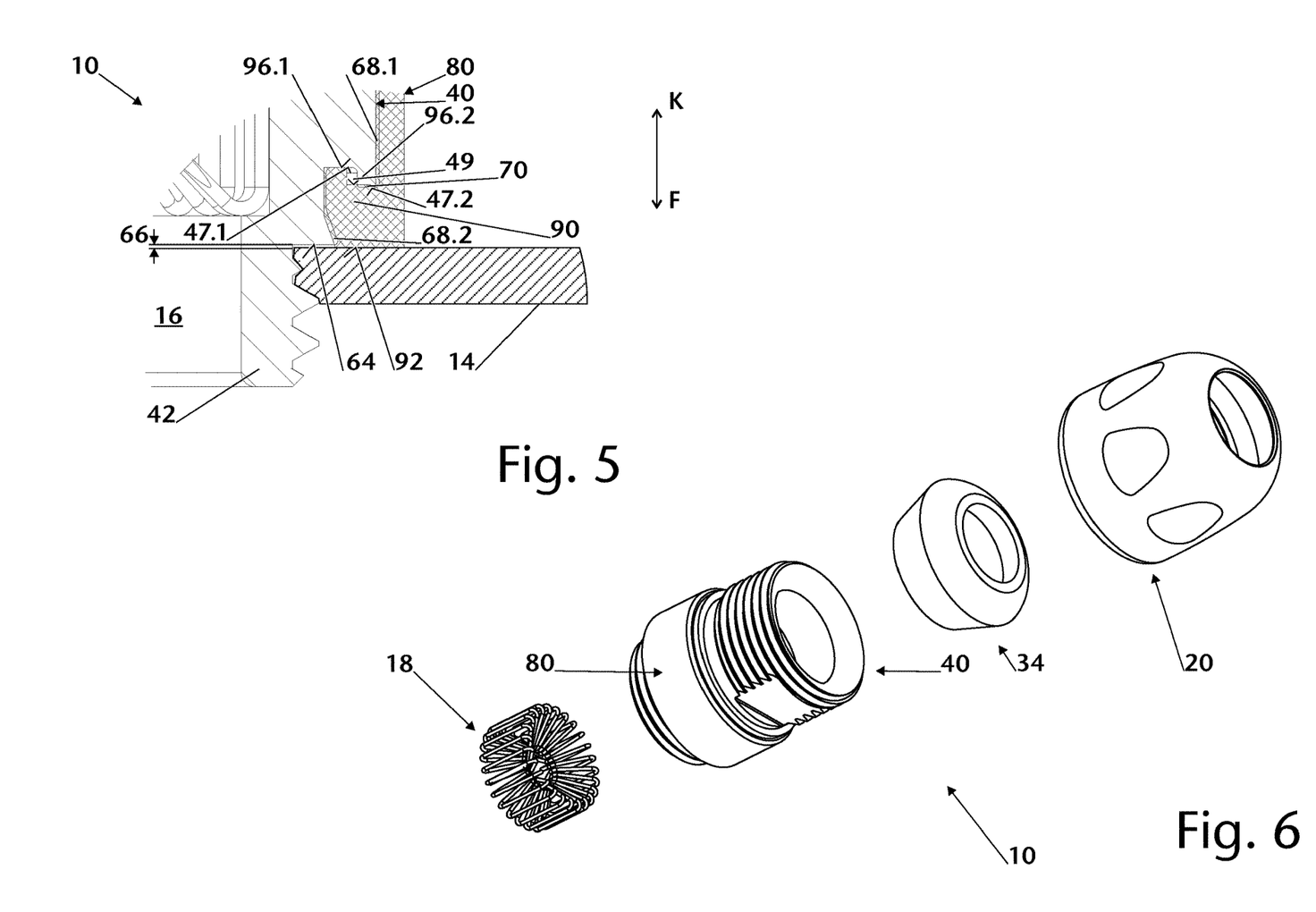
FIG. 5 shows a detail view V from FIG. 3.
FIG. 6 shows an exploded view of form of the screw-connection system according to the teachings of the present disclosure.

FIG. 5 shows a detail view V from FIG. 3, using which the interaction of the surfaces of individual parts of the screw-connection system 10 is illustrated. FIG. 5 shows that the terminal part 40 including the terminal fastener 42 is screwed into the through-opening 16 of the terminal geometry 14 so far that the axial-seal surface 92 of the seal 80 abuts against the terminal geometry 14. The seal 80 protrudes over a terminal-geometry contact surface 64 of the terminal part 40 by a length 66. If the terminal part 40 is screwed further into the terminal geometry 14 such that the terminal-geometry contact surface 64 abuts thereon, the seal 80 is compressed in a defined manner between the terminal geometry 14 and the terminal-geometry contact surface 64 of the terminal part 40. FIG. 5 shows the non-compressed state of the seal 80.

Furthermore it can be seen in FIG. 5 that the axial-seat surfaces 96.1 and 96.2 of the seal 80 interact with the retainer axial surfaces 47.1 and 47.2 of the terminal part 40. The terminal part 40 further includes an undercut 49 into which the projection 90 of the seal 80 engages in an at least partially form-fit manner. The seal 80 is shown interfering with the terminal part 40, which is to be understood as press-fits 68.1 and 68.2 between the seal 80 and the terminal part 40. In particular, in a non-installed state the seal 80 has a smaller clear inner width, which is not indicated here, that is smaller than the outer circumference of the terminal part 40, which is also not further indicated here, at the corresponding position. Furthermore the seal 80 is configured such that it sits on the terminal part 40 with an axial press-fit 70, which is also sketched as an interfering hatching.

FIG. 6 shows another form of the screw-connection system 10 including a terminal part 40, a seal 80 over-molded on the terminal part, an EMC spring 18, a head seal 34, and a pressure element 20.

Figure 7:
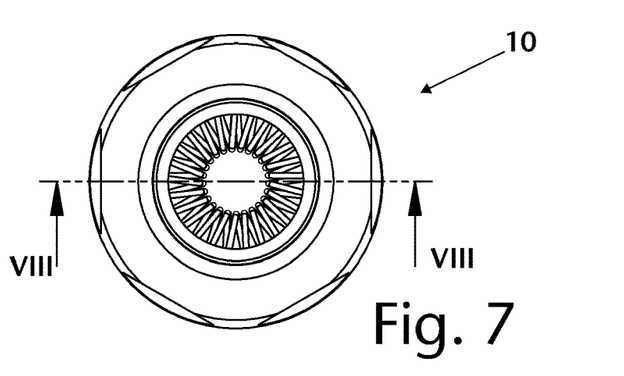
FIG. 7 shows an end view of the screw-connection system from FIG. 6.

FIG. 7 shows an end view of the installed screw-connection system 10 from FIG. 6.

Figure 8:
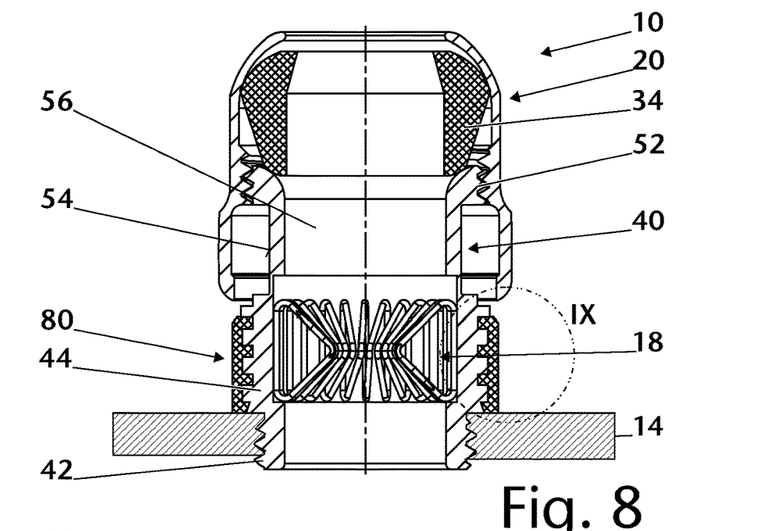
FIG. 8 shows a sectional view VIII-VIII from FIG. 7.

FIG. 8 shows a sectional view VIII-VIII of the screw-connection system 10 from FIG. 7. The pressure element 20 is screwed-on onto the terminal part 40, so that the head seal 34 of pressure element 20 and terminal part 40 can be clamped in. As can also be seen in the previous design in FIG. 3, the thread of the pressure-element terminal 52 is at least partially interrupted by key-system surfaces 54. The EMC spring 18 is disposed in the terminal-part opening 56 of the terminal part 40. The seal 80 configured as a seal sleeve is disposed on the seal section 44 of the terminal part 40.

Figure 9:
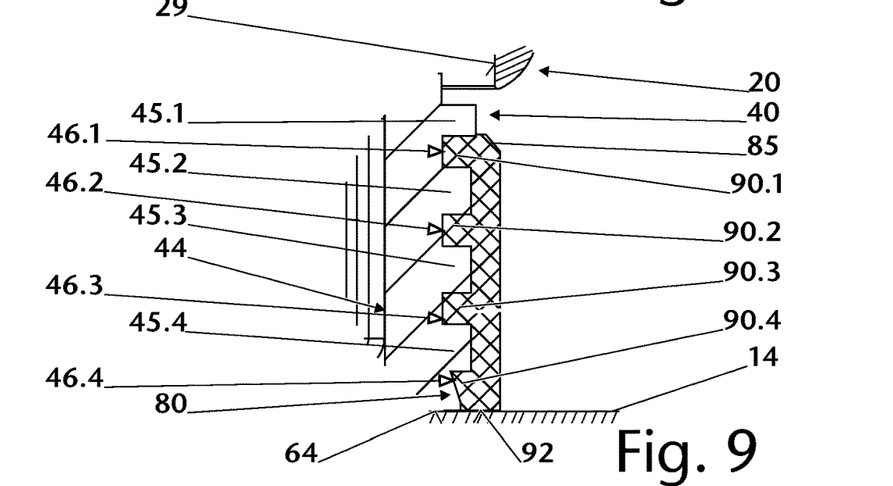
FIG. 9 shows a detail view IX from FIG. 8.

In detail IX from FIG. 8, FIG. 9 shows the applying of the seal 80 onto the seal section 44 of the terminal part 40. Retainer 45.1 to 45.4 of the seal section 44 are configured as ribs that are disposed on the seal section 44 encircling around the seal section 44. In order to inhibit or essentially prevent a displacing of the seal 80 on the terminal part 40, projections 90.1 to 90.4 engage in the spaces 46.1 to 46.4 formed between the retainer 45.1 to 45.4. Here the projection 90.4 engages into a foot-side open space 46.4 that is limited head-side by the retainer 45.4 and thus forms a return. Furthermore the seal 80 includes a chamfer 85 that facilitates pushing the pressure element 20 over the seal 80, in particular in order to form a pressure-contact with the contact surface 29 on the seal 80. Furthermore it can be seen from FIG. 9 that the clear width, not further indicated here, of the pressure element 20 in the contact surface 29 is smaller than the also-not-indicated diameter of the seal 80. A defined pressing of the contact surface 29 on the seal 80 is thereby achieved, which results in an optimal sealing.

It can be seen from FIG. 9 that the terminal part 40 is completely screwed into the terminal geometry 14 so that the terminal-geometry contact surface 64 is in contact with the terminal geometry 14. Together with the axial-seal surface 92 of the seal 80, the terminal-geometry contact surface 64 forms a common seal surface for the terminal geometry 14.

Figure 10:
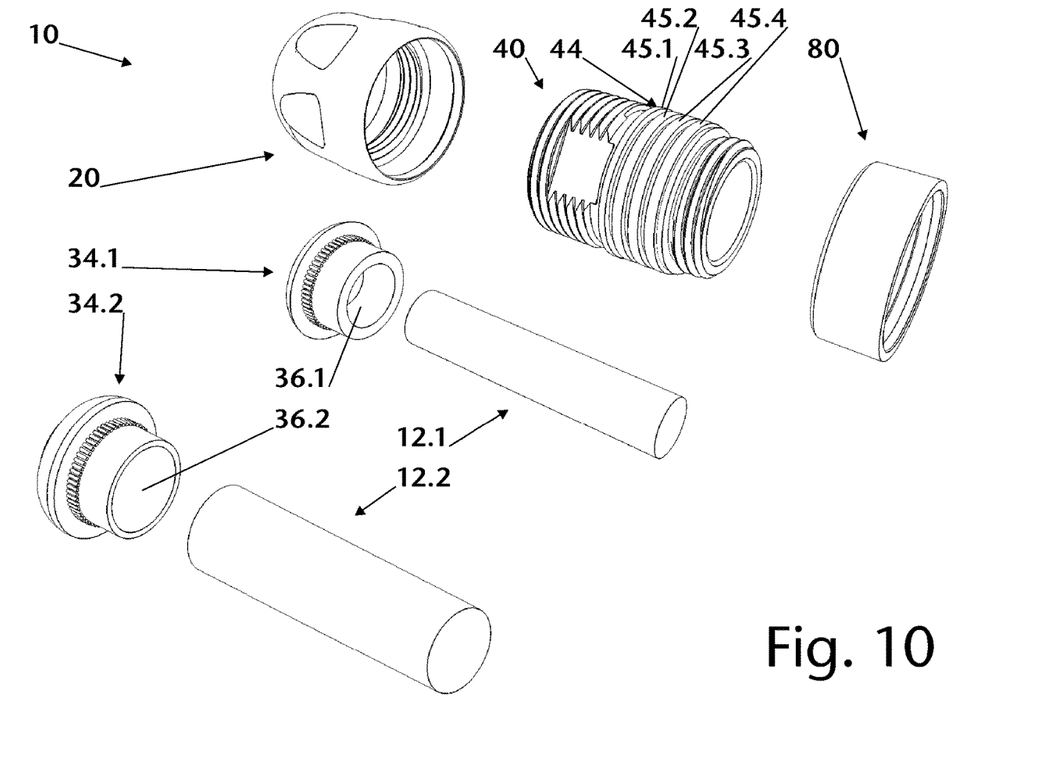
FIG. 10 shows an alternative screw-connection system according to the teachings of the present disclosure.
Figure 11:
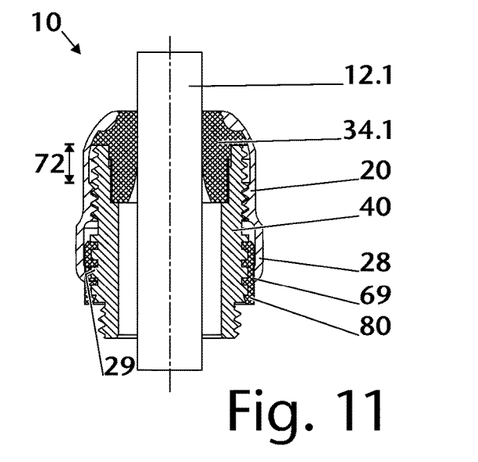
FIG. 11 shows a sectional view of the screw-connection system from FIG. 10 including a long-shaped part having a small diameter.
Figure 12:
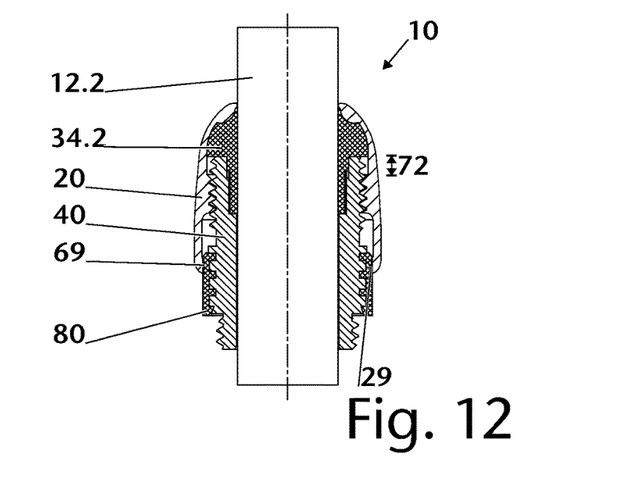
FIG. 12 shows a sectional view of the screw-connection system from FIG. 10 including a long-shaped part having a large diameter.

FIG. 10 shows a screw-connection system 10 including a pressure element 20, a terminal part 40, and a seal 80. The head seal 34 is shown in two compression states 34.1 and 34.2 that are respectively associated with a long-shaped part 12.1 and 12.2 configured as, for example, a hose. As shown in FIGS. 11 and 12, a clear width of the head seal 34 is adaptable to a diameter of the long-shaped parts 12.1 and 12.2. The seal 80 is over-molded onto the terminal part 40 and is depicted separate therefrom for the sake of clarity. The terminal part 40 includes retainer 45.1 to 45.4. The head seal 34 is configured dome-shaped or hat-shaped, seen in cross-section (see FIGS. 11 and 12), and can be inserted between the pressure element 20 and the terminal part 40, in order to adapt the screw-connection system 10, depending on the screw-in depth 72, shown in the FIGS. 11 and 12, of the pressure element 20 on the terminal part 40, to different diameters, not further indicated here, of the long-shaped parts 12.1 or 12.2.

FIG. 11 shows a longitudinal section of the screw-connection system 10 from FIG. 10 including the compressed head seal 34.1, which is clamped-in between the pressure element 20 and the terminal part 40. The long-shaped part 12.1 is inserted into the screw-connection system 10. The pressure element 20 is screwed by the screw-in depth 72 onto the terminal part 40 so far that the compressed head seal 34.1 nestles against the long-shaped part 12.1 with a not-further-indicated small diameter, holds it, and seals it. It can also be seen from FIG. 11 that the pressure element 20 is screwed onto the terminal part 40 that the contact-wall section 28 interacts in a sealing manner with the seal 80. The contact surface 29 of the contact-wall section 28 sits on the seal 80 with a press-fit 69.

FIG. 12 shows a longitudinal section of the screw-connection system 10 from FIG. 10 including the slightly compressed head seal 34.2, which is clamped-in between the pressure element 20 and the terminal part 40. The long-shaped part 12.2, which has a larger diameter, not indicated in more detail here, than the long-shaped part 12.1, is inserted into the screw-connection system 10 and is sealed and retained by the head seal 34.2. For this purpose, the pressure element 20 is screwed onto the terminal part 40 with a lesser screw-in depth 72 in comparison to the FIG. 11 with the long-shaped part 12.1 having the smaller diameter. The screw-in depth 72 is at least such that the contact surface 29 of the contact-wall section 28 sits on the seal 80 with the press-fit 69. With a larger screw-in depth 72, as shown in FIG. 11, less of the seal 80 protrudes out of the pressure element 20 than with a smaller screw-in depth 72, as shown in FIG. 12.

The connections, shown in FIGS. 1 to 12, of terminal part 40 and seal 80 and/or head seal 34, can be configured non-uniform-material. For example, the seal 80 is pushed onto the terminal part 40 or configured such that the seal 80 is over-molded onto the terminal part 40. Alternatively, it is provided that the terminal part 40 and the seal 80 are configured one-piece, for example, in a method work step or in a tool, in particular using a two-component injection-molding method. In a further design it is provided that the terminal part 40 includes the same material as the seal 80 and they are thus manufactured uniform-material. In this design a clear separation between terminal part 40 and seal 80, as shown in FIGS. 1 to 12, can no longer be seen. Furthermore the head seal 34, in particular also independent of the seal 80, can be configured one-piece or uniform-material or non-uniform-material with the terminal part 40.

Figure 13:
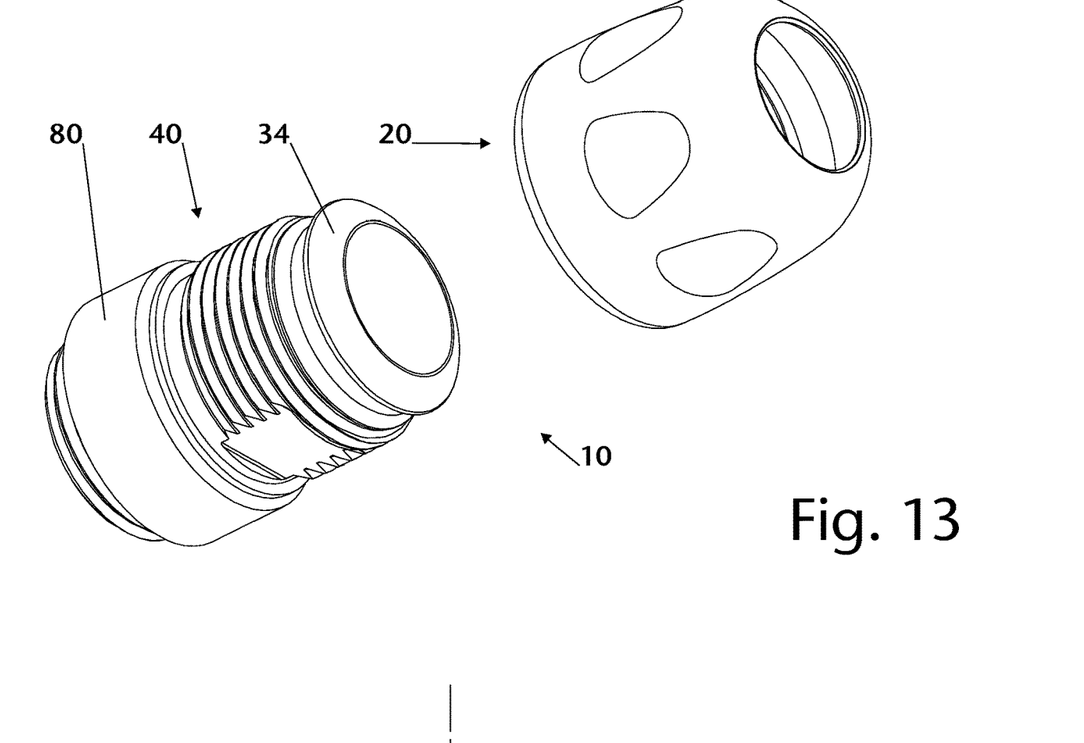
FIG. 13 shows an exploded view of an alternative form of the screw-connection system according to the teachings of the present disclosure.

FIG. 13 shows a design of the screw-connection system 10, wherein the terminal part 40, seal 80 and head seal 34 are configured uniform-material. The screw-connection system shown is in particular two-part and is comprised of terminal part 40 and pressure element 20.

Figure 14:
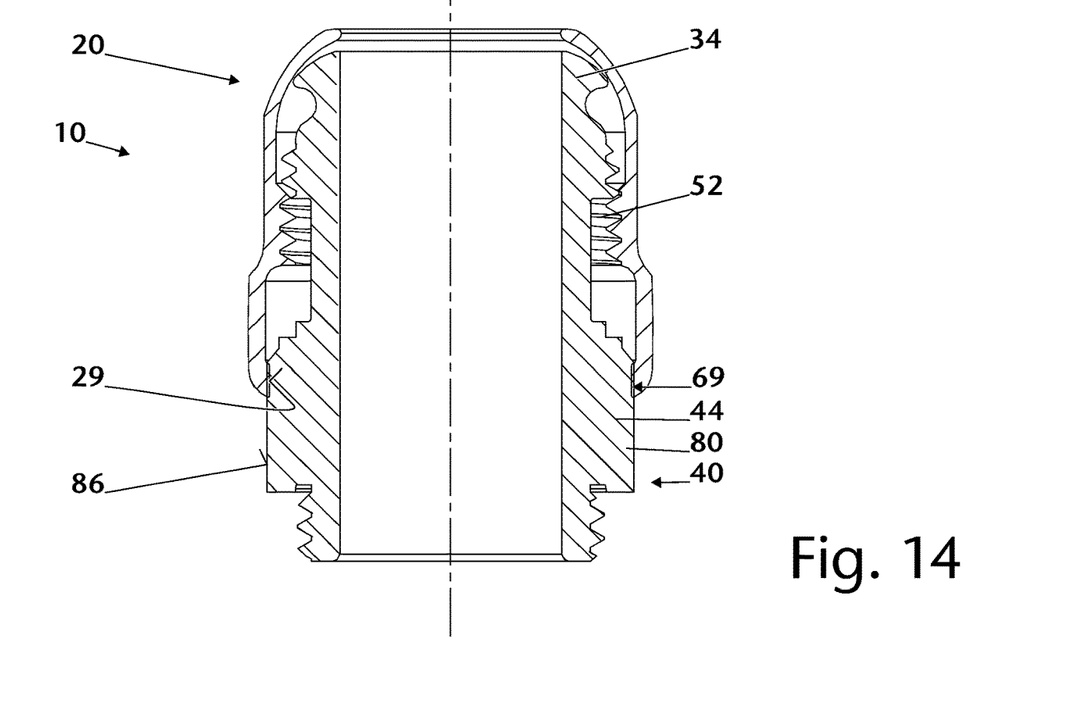
FIG. 14 shows a sectional view of the screw-connection system from FIG. 13.

FIG. 14 shows a longitudinal section through the installed screw-connection system 10 from FIG. 13. In particular it can be seen that the terminal part 40 is uniform-material with the head seal 34 and the seal 80. In particular the seal section 44 forms the seal 80. It can furthermore be seen in FIG. 14 that the pressure element 20 is screwed so far with the pressure-element terminal 52 onto the terminal part 40 that the contact surface 29 of the pressure element 20 including the outer radial-seal surface of the seal 80 interacts in a sealing manner with the press-fit 69.

The variations depicted in the Figures can be configured with a different number of ribs of the seal section and the seal formed as a seal sleeve, or a different number of undercuts as well as with ribs and undercuts in combination, as explained above. Otherwise the designs shown in the Figures can be modified according to the variations mentioned in the above description.

Due to the proposed screw-connection system 10 for at least one long-shaped part, a secure and in particular hygiene-compliant sealing for the foodstuff field can be achieved that requires only few components can thus also offer few nests for microorganisms. The screw-connection system 10 can also be very easily screw-connected, so that handling errors are largely precluded. A matching, for example, to a diameter of the long-shaped part can be simply adapted by the screw-connection system 10, without further components, such as, for example, inserts or washers having to be used.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A screw-connection system for screw-connection of at least one long-shaped part with a terminal geometry, the screw-connection system comprising a pressure element and a terminal part including a seal, wherein the pressure element comprises at least one contact-wall section including a contact surface, wherein the seal comprises an outer radial-seal surface and at least one axial-seal surface, wherein the outer radial-seal surface interacts in a sealing manner at least partially with the contact surface of the at least one contact-wall section, and wherein the axial-seal surface is configured for at least partial sealing with the terminal geometry.

2. The screw-connection system according to claim 1, wherein the terminal part is configured uniform-material with the seal.

3. The screw-connection system according to claim 1, wherein the terminal part is configured non-uniform-material with the seal.

4. The screw-connection system according to claim 1, wherein an attachment structure of the pressure element is connectable to a pressure-element terminal of the terminal part such that the contact-wall section at least partially overlaps a seal section.

5. The screw-connection system according to claim 1, wherein the seal is configured as a seal sleeve.

6. The screw-connection system according to claim 5, wherein the seal configured as the seal sleeve comprises at least one radially-inwardly extending projection that engages at least partially in an form-fit manner into an undercut of the terminal part.

7. The screw-connection system according to claim 5, wherein the seal configured as the seal sleeve projects in a longitudinal direction of the terminal part over a defined length over a terminal-geometry contact surface of the terminal part.

8. The screw-connection system according to claim 5, wherein the seal configured as the seal sleeve comprises at least one projection that engages into at least one space formed between a retainer of a terminal fastener.

9. The screw-connection system according to claim 8, wherein the at least one projection comprises an axial seat surface that interacts with a retainer axial surface of the retainer.

10. The screw-connection system according to claim 1, wherein the seal is configured to be pressed in a sealing manner in a defined manner axially with the terminal geometry and in a defined manner radially with the pressure element.

11. The screw-connection system according to claim 1, wherein the terminal part comprises a terminal fastener, a seal, and a pressure-element terminal, wherein the seal is disposed between the terminal fastener and the pressure-element terminal.

12. A method for installing a screw-connection system, the method comprising:
    introducing a terminal fastener of a terminal part of the screw-connection system into a recess of a terminal geometry, the screw-connection system comprising:
        a pressure element and the terminal part including a seal, wherein the pressure element comprises at least one contact-wall section including a contact surface, wherein the seal comprises an outer radial-seal surface and at least one axial-seal surface, wherein the outer radial-seal surface interacts in a sealing manner at least partially with the contact surface of the contact-wall section, and wherein the axial-seal surface is configured for at least partial sealing with the terminal geometry;
    guiding at least one long-shaped part at least through a receiving opening of the terminal part and an outlet opening of the pressure element; and
    applying the pressure element onto the terminal part such that a seal of the terminal part seals with a contact surface of the pressure element and an axial-seal surface of the seal seals with the terminal geometry.

13. The method according to claim 12, wherein the terminal part is configured uniform-material with the seal.

14. The method according to claim 12, wherein the terminal part is configured non-uniform-material with the seal.

15. The method according to claim 12, wherein an attachment structure of the pressure element is connectable to a pressure-element terminal of the terminal part such that the contact-wall section at least partially overlaps a seal section.

16. The method according to claim 12, wherein the seal is configured as a seal sleeve.

17. The method according to claim 16, wherein the seal configured as the seal sleeve comprises at least one radially-inwardly extending projection that engages at least partially in an form-fit manner into an undercut of the terminal part.

18. The method according to claim 16, wherein the seal configured as the seal sleeve projects in a longitudinal direction of the terminal part over a defined length over a terminal-geometry contact surface of the terminal part.

19. The method according to claim 16, wherein the seal configured as the seal sleeve comprises at least one projection that engages into at least one space formed between a retainer of the terminal fastener.

20. The method according to claim 16, wherein the at least one projection comprises an axial seat surface that interacts with a retainer axial surface of the retainer.

* * * * *